United States Patent
Pinsenschaum et al.

(10) Patent No.: US 7,104,566 B2
(45) Date of Patent: Sep. 12, 2006

(54) AIRBAG MODULE AND COVER ARRANGEMENT

(75) Inventors: Ryan T. Pinsenschaum, Vandalia, OH (US); Mark T. Winters, Vandalia, OH (US); Nicholas J. Awabdy, Xenia, OH (US)

(73) Assignee: Delphi Technologies, Inc., Troy, MI (US)

( * ) Notice: Subject to any disclaimer, the term of this patent is extended or adjusted under 35 U.S.C. 154(b) by 397 days.

(21) Appl. No.: 10/407,143

(22) Filed: Apr. 4, 2003

(65) Prior Publication Data

US 2004/0004343 A1 Jan. 8, 2004

Related U.S. Application Data

(60) Provisional application No. 60/375,480, filed on Apr. 25, 2002.

(51) Int. Cl.
*B60R 21/20* (2006.01)

(52) U.S. Cl. .................................. 280/728.3
(58) Field of Classification Search ............. 280/728.3, 280/728.2, 732
See application file for complete search history.

(56) References Cited

U.S. PATENT DOCUMENTS

| | | | |
|---|---|---|---|
| 5,306,042 A | 4/1994 | Frank | 280/728 |
| 5,316,334 A | 5/1994 | Skidmore | 280/728 |
| 5,320,381 A | 6/1994 | Barnes et al. | 280/728 |
| 5,460,401 A | 10/1995 | Gans et al. | 280/728.3 |
| 5,460,402 A | 10/1995 | Rhodes | 280/728.3 |
| 5,553,746 A * | 9/1996 | Jones | 222/129.1 |
| 5,899,488 A * | 5/1999 | Muller | 280/728.3 |
| 6,135,492 A | 10/2000 | Zimmerbeutel et al. | |
| 6,196,574 B1 | 3/2001 | Stevermann | 280/728.3 |
| 6,286,858 B1 | 9/2001 | Sheperd et al. | |
| 6,361,064 B1 | 3/2002 | Hopf et al. | |
| 6,422,589 B1 | 7/2002 | Ostermann et al. | |
| 6,527,295 B1 * | 3/2003 | Muller | 280/728.3 |
| 6,565,113 B1 | 5/2003 | Kassman et al. | |
| 6,626,455 B1 | 9/2003 | Webber et al. | |

FOREIGN PATENT DOCUMENTS

| | | |
|---|---|---|
| DE | 4217177 A1 | 5/1992 |
| DE | 1975437 A1 | 12/1997 |
| EP | 0669230 A1 | 1/1995 |
| JP | 11211260 | 7/1999 |

\* cited by examiner

*Primary Examiner*—Faye M. Fleming
(74) *Attorney, Agent, or Firm*—Scott A. McBain

(57) ABSTRACT

A door for an airbag module having a housing, an inflatable cushion, the airbag module being adapted to be used in a vehicle having an instrument panel with an airbag module opening, the door having an inner surface and an outer surface adapted to match the instrument panel, comprising: a first member depending away from the inner surface of the door, the first member being movably secured to the airbag module for relative movement therebetween and remains secured to the module during deployment of the inflatable cushion; a pair of second members depending away from the inner surface of the door, the pair of second members each having an opening for receiving a guiding member depending away from the housing; wherein the configuration of the first member and the openings of the pair of second members allows the door of the airbag module to deploy in a first direction until the first member reaches a point of maximum movement in the first direction, wherein the door continues to deploy in a second direction that is defined by further movement of the guiding member in the opening.

31 Claims, 10 Drawing Sheets

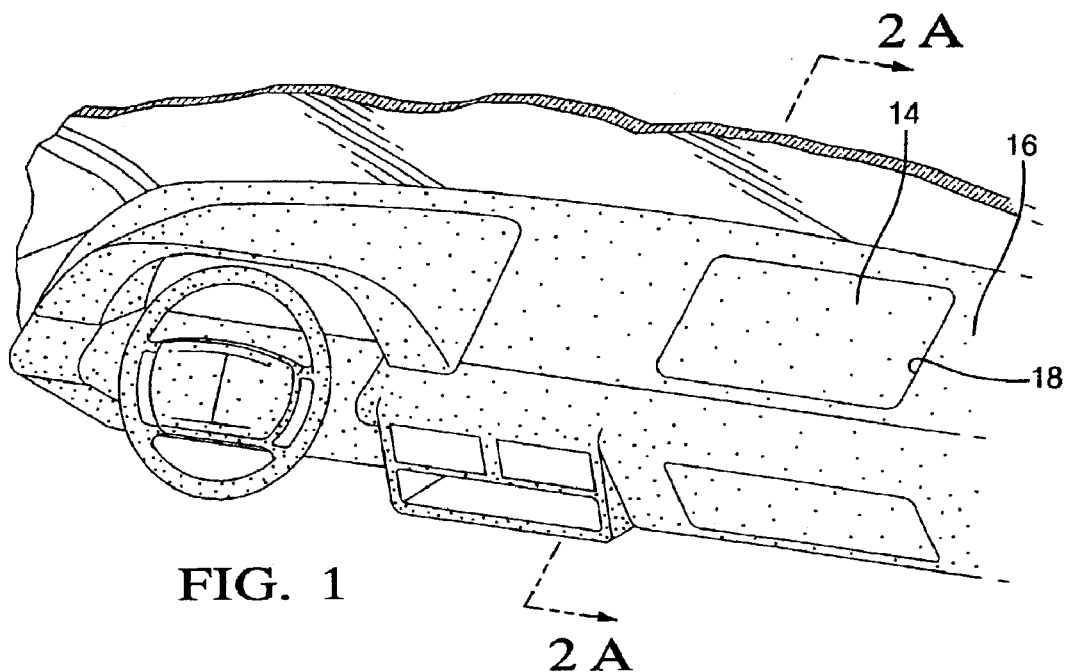
FIG. 1
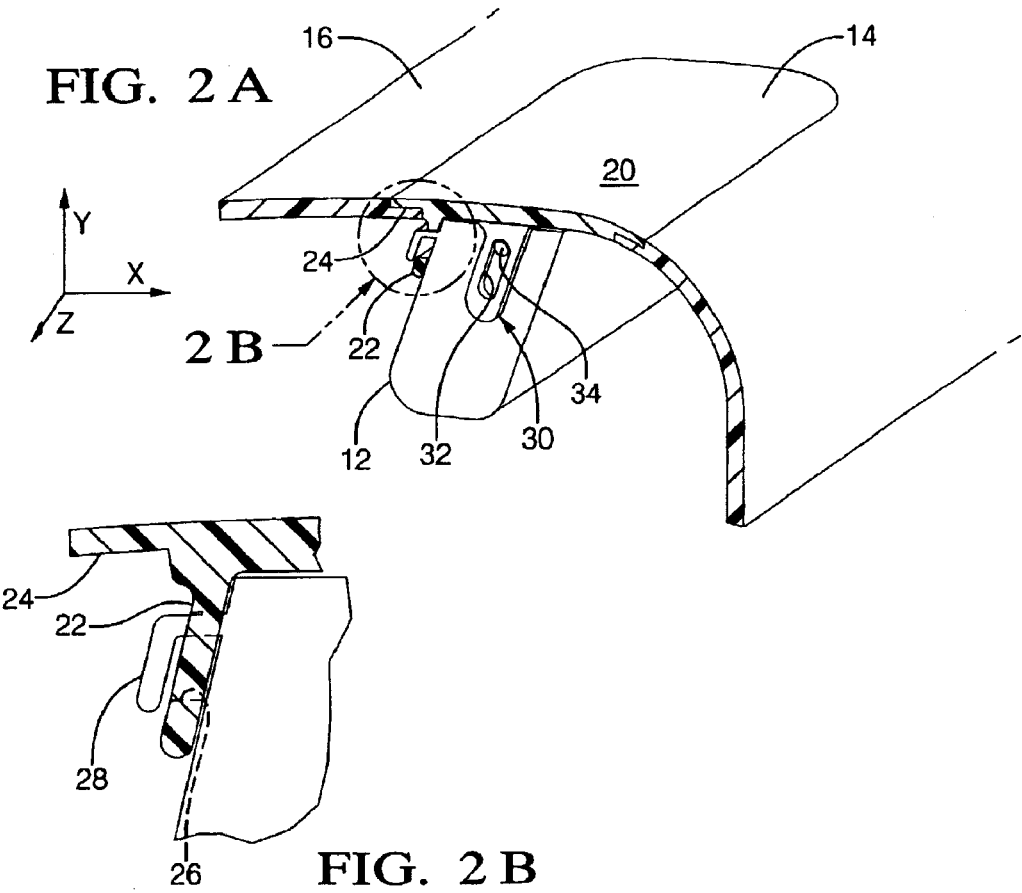
FIG. 2A
FIG. 2B

US 7,104,566 B2

AIRBAG MODULE AND COVER ARRANGEMENT

CROSS REFERENCE TO RELATED APPLICATIONS

This application claims the benefit of U.S. Provisional Patent Application, Ser. No. 60/375,480, entitled: Air Bag Module, filed Apr. 25, 2002, the contents of which are incorporated herein by reference thereto.

TECHNICAL FIELD

This disclosure relates generally to airbag modules. More specifically, this disclosure relates to a cover arrangement for an airbag module, and more particularly, to an airbag cover to module attachment that provides for relative movement between the cover and the module.

BACKGROUND

Airbag modules or supplemental inflatable restraint systems have become common in modern automobiles. An airbag module typically comprises an inflatable cushion and an inflator within a housing. The module is installed in a desired position within the vehicle, such as the steering wheel, the dashboard, the seat, the A-pillar, and other locations. The inflatable cushion is stored in a folded position within the housing in fluid communication with the inflator. In response to an activation event or occurrence, a sensor or sensing device provides a signal for activating the inflator. The inflator then provides a supply of inflating gas to the cushion deploying it from the housing.

As more and more vehicles are equipped with airbag modules, other vehicle components have been modified to accommodate the use of such systems. For example, most passenger side airbag module systems are disposed within and behind an instrument panel, which extends across the width of a vehicle compartment. During assembly, a conventional instrument panel in a vehicle having a passenger side airbag module system requires a discrete door which covers an opening formed in the instrument panel for the air bag cushion to deploy through upon actuation of the airbag module system. This separate door is designed to open in response to the force of the expanding air bag cushion. In other words as the pressure in the air bag cushion increases, an internal force is generated within the cushion and as the air bag cushion expands with this force, the door selectively separates from a portion of the module and the instrument panel as the air bag cushion deploys while another portion of the door remains secured to the module during deployment.

Typically, the manufacture of an instrument panel involves forming an opening in the instrument panel proximate to the airbag module system. This opening is then covered by a separate deployable door of the airbag module, which is secured to the instrument panel and faces the occupants of the vehicle. Thus, the instrument panel itself is manufactured in view of the shape and size of the door and the door is separately manufactured and installed within the opening in the instrument panel.

Typically, the deployable doors of the passenger airbag module are secured within and to the opening of the instrument panel and the resulting force of the inflating airbag tears open a tear seam in the show surface of the door and/or a tear seam in the securing features adapted to secure the door to the instrument panel.

SUMMARY

A door for an airbag module having a housing, an inflatable cushion, the airbag module being adapted to be used in a vehicle having an instrument panel with an airbag module opening, the door having an inner surface and an outer surface adapted to match the instrument panel, comprising: a first member depending away from the inner surface of the door, the first member being movably secured to the airbag module for relative movement therebetween and remains secured to the module during deployment of the inflatable cushion; a pair of second members depending away from the inner surface of the door, the pair of second members each having an opening for receiving a guiding member depending away from the housing; wherein the configuration of the first member and the openings of the pair of second members allows the door of the airbag module to deploy in a first direction until the first member reaches a point of maximum movement in the first direction, wherein the door continues to deploy in a second direction that is defined by further movement of the guiding member in the opening.

A door for an airbag module having a housing, an inflatable cushion, the airbag module being adapted to be used in a vehicle having an instrument panel with an airbag module opening, the door having an inner surface and an outer surface adapted to match the instrument panel, comprising: a first means for movably securing a forward portion of the door to the housing for relative movement therebetween wherein the forward portion remains secured to the module during deployment of the inflatable cushion; a second means for movably securing side portions of the door to side walls of the housing; wherein the configuration of the first means and the second means allows the door of the airbag module to deploy in a first direction until the first means reaches a point of maximum movement in the first direction, wherein the door continues to deploy in a second direction that is defined by the second means.

A door for an airbag module having a housing, an inflatable cushion, the airbag module being adapted to be used in a vehicle having an instrument panel with an airbag module opening, the door having an inner surface and an outer surface adapted to match the instrument panel, comprising: a pair of securing members depending away from the inner surface of the door, each of the pair of securing members having an opening configured to slidably receive a guiding member depending outwardly from a side wall of the housing, the opening of each of the pair of securing members defining two discrete paths of travel for the guiding member, wherein an application of a force to a rearward edge of the door will cause the guiding member to travel in one of the two discrete paths of travel during deployment of the inflatable cushion and the guiding member will travel in the other one of the two discrete paths in absence of the application of the force to the rearward edge of the door.

An airbag module having an inflatable cushion for use in a vehicle having an interior surface, comprising: a housing; a deployment door having an exterior surface and an inner surface, the exterior surface comprises a portion of the interior surface of the vehicle; a first member depending away from the inner surface of the door, the first member being movably secured to the airbag module for relative movement therebetween and remains secured to the module during deployment of the inflatable cushion; a pair of second members depending away from the inner surface of the door, the pair of second members each having an opening for receiving a guiding member depending away from the housing; wherein the configuration of the first member and the openings of the pair of second members allows the door of the airbag module to deploy in a first direction until the first member reaches a point of maximum movement in the first direction, wherein the door continues to deploy in a second direction that is defined by further movement of the guiding member in the opening.

An airbag module having an inflatable cushion for use in a vehicle having an interior surface, comprising: a housing; a deployment door having an exterior surface and an inner surface, the exterior surface comprises a portion of the interior surface of the vehicle; a first means for movably securing a forward portion of the door to the housing for relative movement therebetween wherein the forward portion remains secured to the module during deployment of the inflatable cushion; a second means for movably securing side portions of the door to side walls of the housing; wherein the configuration of the first means and the second means allows the door of the airbag module to deploy in a first direction until the first means reaches a point of maximum movement in the first direction, wherein the door continues to deploy in a second direction that is defined by the second means.

The above-described and other features are appreciated and understood by those skilled in the art from the following detailed description, drawings, and appended claims.

DESCRIPTION OF THE DRAWINGS

FIG. 1 is a perspective view of a portion of a vehicle interior;

FIG. 2 is a partial cross-sectional/perspective view of an airbag module cover arrangement of an embodiment of the present disclosure in a closed non-deployment configuration;

DETAILED DESCRIPTION

Figure 3:
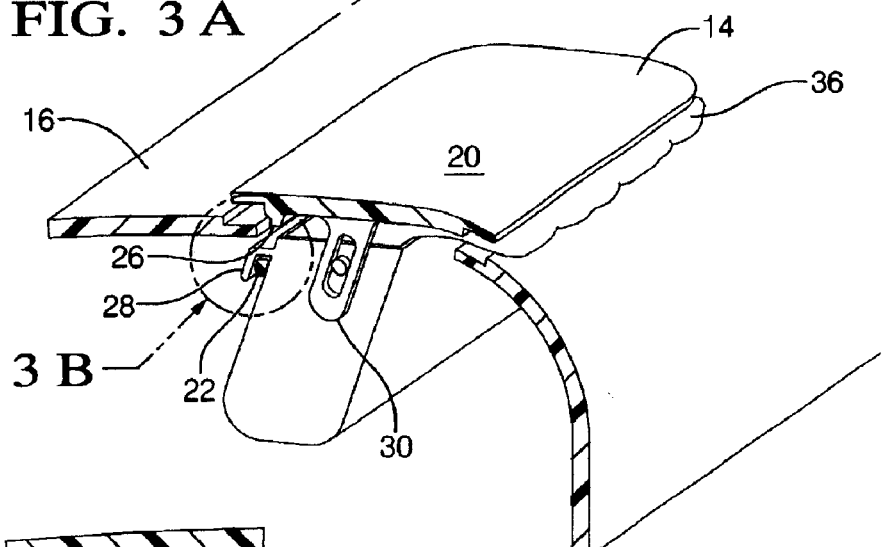
FIG. 3 is a partial cross-sectional/perspective view of an airbag module cover arrangement of an embodiment of the present disclosure in a first deployment configuration.
Figure 3:
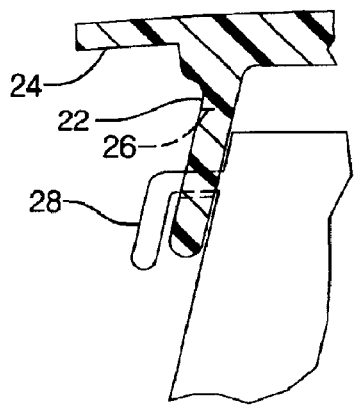

The present disclosure relates to a passenger airbag door which is adapted for selective deployment away from a housing of an airbag module when the inflatable cushion of the module deploys. The door has an outer surface adapted to match the instrument panel and includes a first means for movably securing a forward portion of the door to the housing for relative movement therebetween wherein the forward portion remains secured to the module during deployment of the inflatable cushion; and a second means for movably securing side portions of the door to side walls of the housing, wherein the configuration of the first means and the second means allows the door of the airbag module to deploy in a first direction until the first means reaches a point of maximum movement in the first direction, while the door continues to deploy in a second direction that is defined by the second means. The second means being adapted to provide varying modes or sequences of deployment of the door.

Referring initially to FIGS. 1–4, an airbag module 10 constructed in accordance with the present disclosure is illustrated. Airbag module 10 includes a housing 12, which is configured to receive and house components of airbag module 10 such components are known to one skilled in the art and include but are not limited to the following: an inflator; an inflatable cushion; a retaining ring; and a cover or door that is configured to deploy away from the module upon inflation of the inflatable cushion. The inflator is in fluid communication with an inflation opening of the inflatable cushion and the inflator provides a means for inflating the inflatable cushion in the event of a deployment scenario. The retainer ring provides a means for securing the inflatable cushion to housing. The initiation and inflation of the inflatable cushion are performed in accordance with known technologies, which would be obvious to one skilled in the related arts.

Housing 12 is configured to have a trough or "U" shaped configuration with a pair of opposing sidewalls, a bottom and an opening positioned for allowing the inflatable cushion to deploy therefrom. Of course, and as applications may require, housing 12 can be configured to have various other configurations. In an exemplary embodiment housing 12 is manufactured out of steel by an extrusion or stamping process. Of course, housing 12 can be manufactured out of other materials including but not limited to other types of metals (e.g. aluminum) and/or polymer materials (e.g., plastic) as well as other methods (e.g., injection molding) that will allow for the inclusion of the features which will be described in more detail below.

A deployable cover or door 14 is positioned on top of housing 12 and allows for deployment of an inflatable cushioned therethrough. Deployable cover 14 is formed out of a material that is lightweight and easily molded (e.g., a polymer such as plastic). In addition, it is also desirable to form deployable cover 14 out of the same material as the instrument panel. For example, deployable cover 14 is formed out of a material having similar characteristics (e.g., color, texture, etc.) as the instrument panel. In accordance with an exemplary embodiment, airbag module 10 is secured within a vehicle by attaching housing 12 to a structural member of the vehicle while cover 14 is removably secured to an interior surface 16 of the vehicle as well as a portion of the housing. In an exemplary embodiment the interior surface of the vehicle is the instrument panel, in particular, the periphery of an airbag module opening 18 in the instrument panel. In addition, and as an alternative embodiment or in order to assist in securing the deployable door to the instrument panel a plurality of detachable hooks are integrally formed to the inner surface of the deployable door and are configured to engage a portion of the instrument panel disposed about the periphery of the opening defined therein.

Housing 12 is secured to a cross car structural beam through the use of a plurality of securement features depending outwardly from housing 12 and cover 14 is secured to the periphery of an opening in an instrument panel of the vehicle as well as being movably secured to the housing. Thus, a "floating door" is provided wherein the door is able to be first fixedly secured to the insured panel in the preferred location and the housing may be manipulated to the secured to a structural member of the vehicle without affecting the alignment of the show surface of the door with the show surface of the instrument panel.

Referring now to FIG. 2, cover 14 includes an exterior surface 20, which faces toward an occupant of the vehicle as well as forms a portion of the instrument panel surface. As referred to herein forward or forward edge is intended to designate the edge of the deployable door or cover that is closest to the windshield or forward end of the vehicle and rearward edge or rearward is intended to designate the edge of the deployable door or cover that is opposite to the forward edge or closer to the rearward end of the vehicle.

Cover 14 also includes a member or forward door flange 22 that depends or extends downwardly from an interior surface 24 of cover 14. Member 22 is located at a forward end of the cover and is positioned to be located at a forward end of the module when the cover is removably secured thereto. The forward end of the module and complementary portion of the cover is located closer to a windshield of the vehicle when the module is secured to the instrument panel. It is also noted that the forward end of the cover is the portion of the cover that remains attached to the cover in the event of a deployment scenario wherein the inflatable cushion causes the cover to deploy away from the module. In an exemplary embodiment member 22 is integrally formed with the cover and comprises resilient qualities in order to provide a hinge member for hingably connecting the cover to the housing of the module.

Member 22 comprises a planar member having a rectangular configuration that has a length that runs along the housing in for example a cross car direction. Of course, member 22 may resemble other configurations plurality of tabs depending from the interior surface of the cover. In addition, and as an alternative configuration cover 14 and member 22 may be configured to run along one of the ends of the module (e.g., in a fore and aft direction) as well as having other types of configurations (e.g., other than rectangular).

Member 22 includes an opening 26 or plurality of openings 26 configured to receive a portion of a securement assembly or means 28 that movably secures member 22 to the housing of the module. The configuration of openings 26 and securement assembly 28 allows member 22 and thus, cover 14 to move with respect to housing 12.

At another location and at either end of cover 14 a pair of side members or side door flanges 30 are disposed on either side of the cover and the side door flanges depend downwardly from the interior surface of the cover. In an exemplary embodiment side members or side door flanges 30 are integrally formed with the cover and comprises resilient qualities for connecting the cover to the housing of the module. Side members or side door flanges 30 are each configured to have an opening 32 configured to receive a guiding member 34 that is secured to the housing and depends outwardly from a side wall of the same. In an exemplary embodiment and as illustrated in FIG. 2 members 30 are disposed on opposite sides or sidewalls of housing 12. In accordance with the present disclosure guiding member can comprise a pin which depends from or is integral with a side wall of the housing. The pin or guiding member will be of a sufficient length to allow movement of side member 30 proximate to the side wall of the housing without making contact with the same. Also, the pin or guiding member can be configured to comprise a bushing or enlarged portion to provide the required distance between the side walls of the housing and the member 30. Moreover, a retaining means is contemplated for being disposed on the end of the guiding member or pin after it has passed through opening 32. The retaining means may comprise any method known in the related arts for example but not limited to nuts, rivets, studs, etc. In addition, and in an exemplary embodiment the guiding member and side door flanges are positioned to interact with each other at the exterior portions of the housing. Of course, it is also contemplated that the side door flanges and the guiding members can interact with each other inside the housing.

The configurations of openings 26 and 33 and their respective securement features received therein are configured to allow for movement of flanges or members 22 and 32 and accordingly cover 14 in three different directions namely, the opening is larger than the portion received therein. For example, the 'X', 'Y' and 'Z' directions illustrated in FIG. 2.

One advantage of this movement is to allow for a flush or continuous placement or mounting of deployable cover 14 within the opening defined in the instrument panel. For example, and in one embodiment deployable cover 14 is movably secured to housing 12 then the module is positioned in through the opening in the instrument panel wherein the periphery of the cover is secured to the periphery of the opening in the instrument panel. Since the cover is secured to the module to allow movement therebetween, the housing is capable of movement with respect to the cover to align securement openings, bolts or other types of securement means with the structural features or opening of the instrument panel or other structural member in the vehicle. This allows for manipulation of the housing after securement of the cover to the instrument panel without adversely affecting the cover and the instrument panel relationship.

Alternative means for securing the forward edge of the cover to the housing in a movable manner are found in U.S. provisional applications, Ser. No. 60/390,906, entitled: Cover for Airbag Module and Method of Making, filed Jun. 24, 2002, and Ser. No. 60/391,005, entitled: Cover for Airbag Module and Method of Making, filed Jun. 24, 2002, and U.S. patent application Ser. No. 10/391,817, filed Mar. 19, 2003, the contents of which are all incorporated herein by reference thereto.

Figure 4:
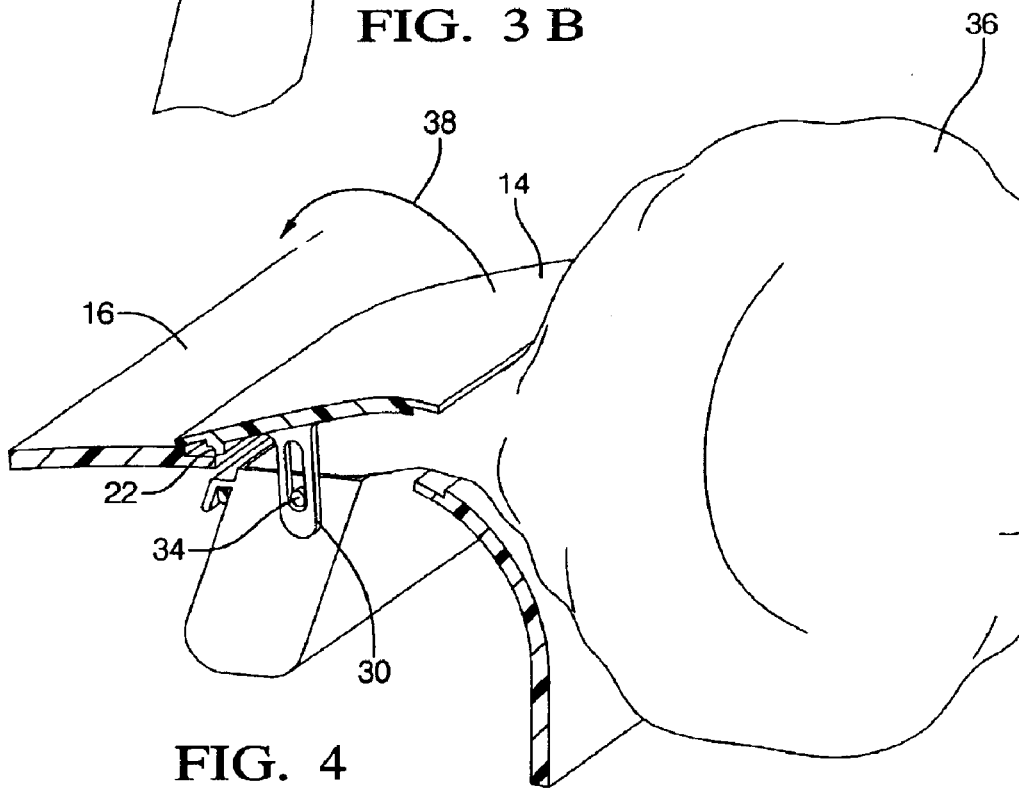
FIG. 4 is a partial cross-sectional/perspective view of an airbag module cover arrangement of an embodiment of the present disclosure in a second deployment configuration.

Referring now to FIGS. 2–4 deployment of the door of an exemplary embodiment of the present disclosure is illustrated. In this embodiment it is noted that the configuration of opening 26 and securement feature 28 is such that during an initial stage of deployment (FIG. 3) both openings 26 and 32 will allow the door to translate upwardly with regard to the housing and the instrument panel. At this stage of deployment an initial gap is created between the rearward edge of the door (closer to vehicle occupant and further away from windshield than the forward edge) and the surrounding portion of the instrument panel, wherein a portion of inflatable cushion 36 is allowed to deploy therethrough.

However, and when the airbag module is at the stage of deployment illustrated in FIG. 3 (e.g., translation upwardly of the door of the airbag module) opening 26 and securement feature 28 are configured such that feature 28 will make contact with an end portion or side wall of opening 26 prior to feature 34 making contact with an end portion or side wall of opening 32 of member 30. Accordingly, further upward movement of the door relative to member 22 is prevented while upward movement of the door relative to member 30 is allowed. Thus, and referring now to FIG. 3 and as the inflatable cushion continues inflating, the door is pivoted or rotated in the direction of arrow 38 wherein the initial gap between the rearward edge of the door and the surrounding portion of the instrument panel is increased and the inflatable cushion deploys therethrough.

Accordingly, the configuration of members 22 and 30 and their respective openings and securement features allow the deployable door of the airbag module to translate upwardly in a first direction prior to rotational movement in a second direction during the deployment of the inflatable cushion. Therefore, the deployable door of the embodiments of FIGS. 2–4 deploys or translates upwardly prior to it rotating towards the windshield wherein the gap through which the inflatable cushion deploys is increased.

Therefore, the deployment door configuration of embodiments of FIGS. 2–4 provides a dual to multiple articulating path for the door, which enhances operation of the same by reducing the required break out force in addition to provide a path for the inflatable cushion to deploy therethrough.

Referring now to FIGS. 5A–9B alternative embodiments and/or configurations of side member 30 and deployable door 14 are illustrated. It is noted that for ease of description the forward member 22 of each of the embodiments of FIGS. 5A–9B is illustrated as being substantially the same. However, member 22 is contemplated as including any one of the previously mentioned securement arrangements.

Figure 5A:
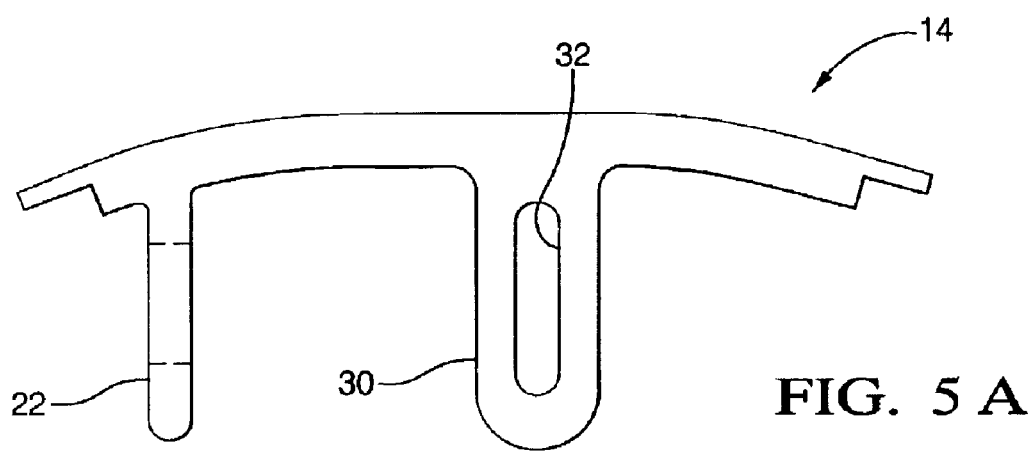
FIGS. 5A–C are alternative embodiments of an airbag module cover arrangement of the present disclosure.

Also, and in each of the covers illustrated in FIGS. 5A–9B, the side members are contemplated as being positioned on both edges of the deployable cover or door 14. Referring now to FIGS. 5A–5C, side member 30 and its corresponding opening 32 are configured to have multiple orientations. For example, in FIG. 5A the opening 32 is orientated to have a generally vertical configuration. In FIG. 5B the opening 32 is orientated to have an "L" shape with an elbow portion 40 being arcuate in shape in order to facilitate the sliding of guiding member 34 therethrough. The configuration illustrated in FIG. 5B allows the deployable door to translate upwardly and then translate forwardly. In FIG. 5C the opening 32 is orientated to have an inverted "L" shape with an elbow portion 40 being arcuate in shape in order to facilitate the sliding of guiding member 34 therethrough. The configuration illustrated in FIG. 5C allows the door to translate forwardly and upwardly.

Figure 5B:
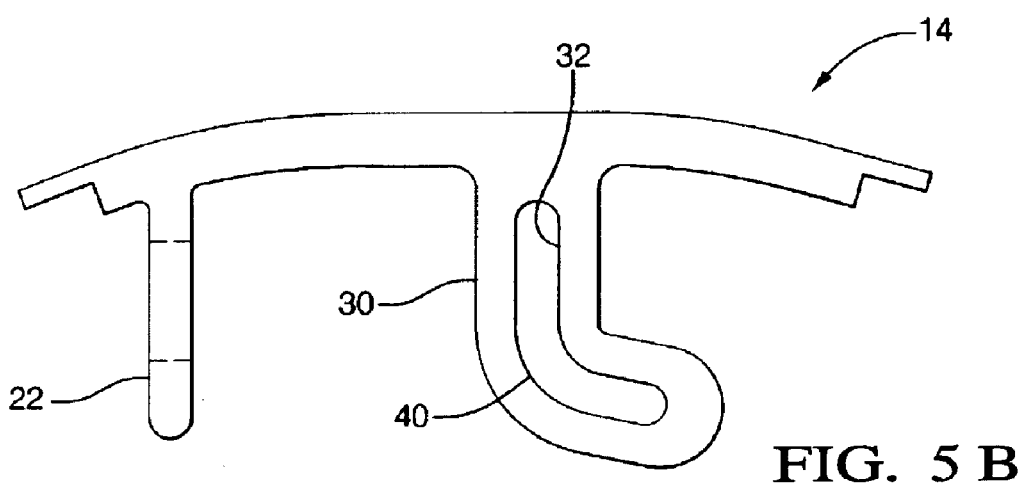
Figure 5C:
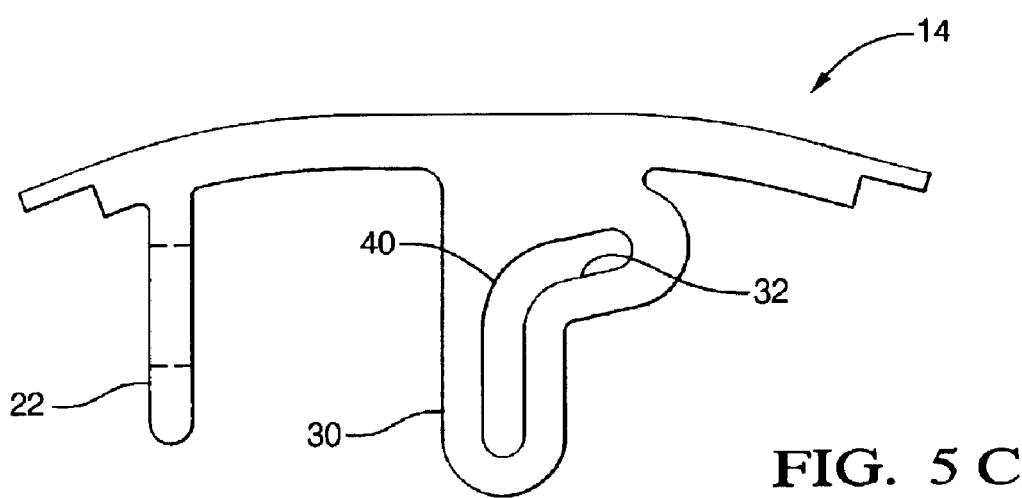
Figure 6:
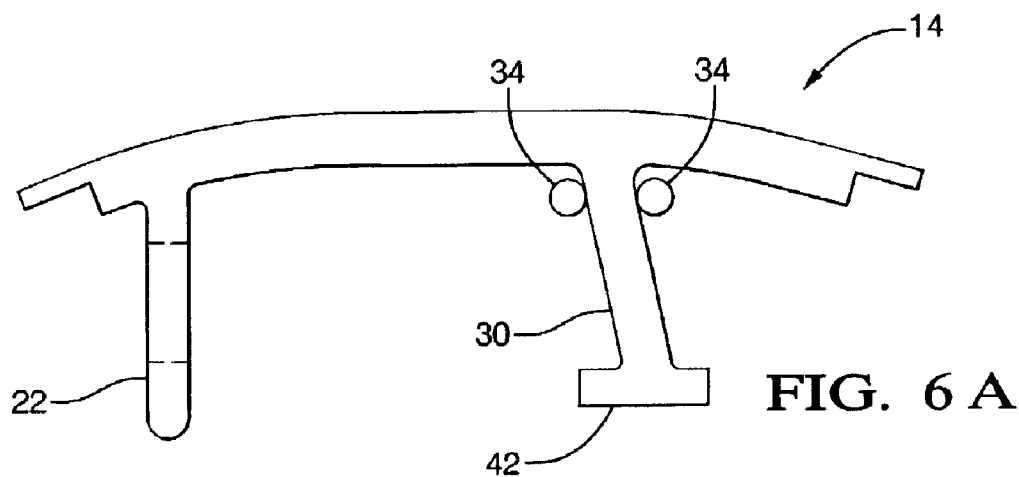
FIGS. 6A–C are other alternative embodiments of an airbag module cover arrangement of the present disclosure.
Figure 6:
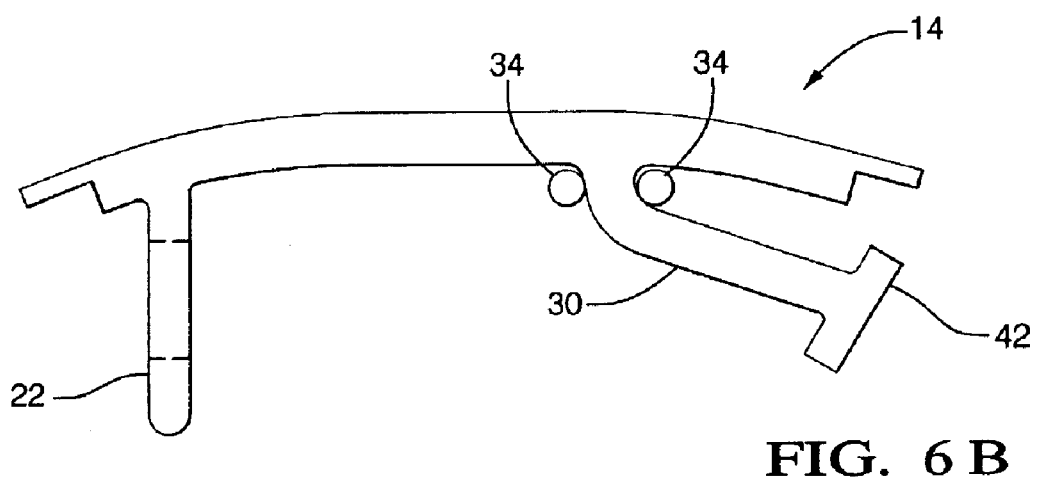
Figure 6:
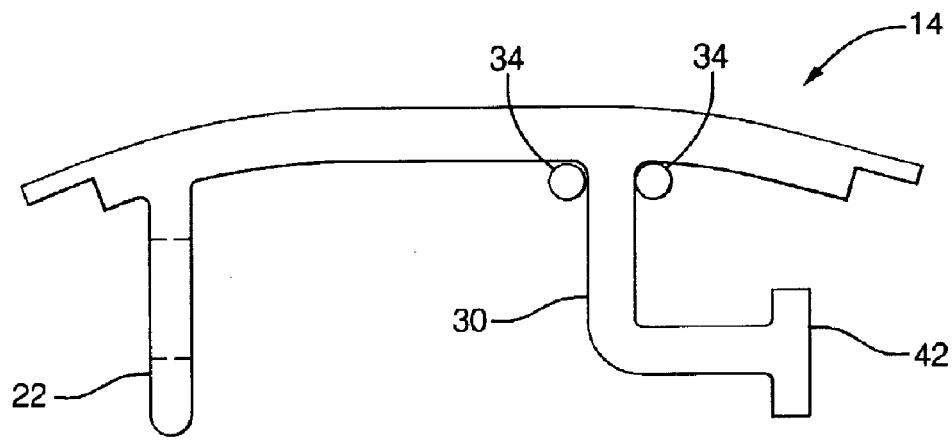

In the orientations of FIGS. 5B and 5C the extended portions of the opening allow for further rotation, translation or movement of the door in the direction of arrow 38. In each of the embodiments of FIGS. 5A–5C members 22 and 30 are of a sufficient strength to retain or provide an upper limit of rotation of the deployable door as it rotates in the direction of arrow 38. In addition, and as an alternative embodiment, the configuration of side members 30 and deployable door 14 are such that once the deployable door reaches its upper limit of translation or rotation defined by the portion of side member 30 which engages its complementary guiding and stopping means, the deployable door will define a chute or means for guiding the deployment of the inflatable cushion.

Referring now to FIGS. 6A–6C the side members 30 are each configured to be received within a pair of guiding members 34, which are disposed or orientated to travel along exterior surfaces of the side members and the side members are each provided with an end portion 42, which is configured to provide a stopping surface for engaging guiding members 34. Referring now to FIG. 6A side member 30 is configured to have a slight angle with respect to deployable door 14 thus; angular rotation in the direction of arrow 38 is facilitated by the angular configuration of side member 30. Referring now to FIG. 6B side member 30 is configured to have a greater angular configuration with respect to deployable door 14 thereby providing a different type of angular rotation in the direction of arrow 38. Referring now to FIG. 6C side member 30 is configured to have an "L" shaped configuration with an elbow portion. The configuration illustrated in FIG. 6C allows for translation upward to the point where guiding members 34 interact with the elbow portion of the side member 30 and then the deployable door will rotate in the direction of the 38 as guiding members 34 pass by the elbow portion of side member 30.

Figure 7A:
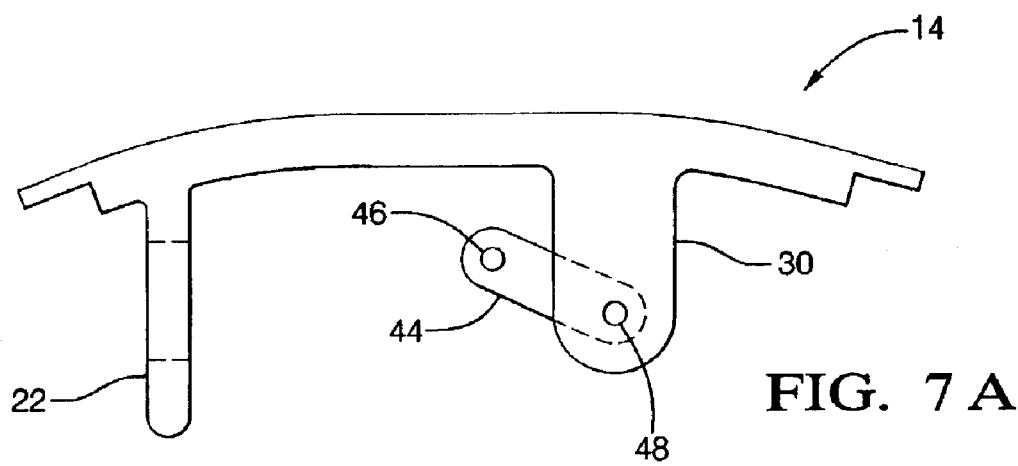
FIGS. 7A–C are more alternative embodiments of an airbag module cover arrangement of the present disclosure.
Figure 7B:
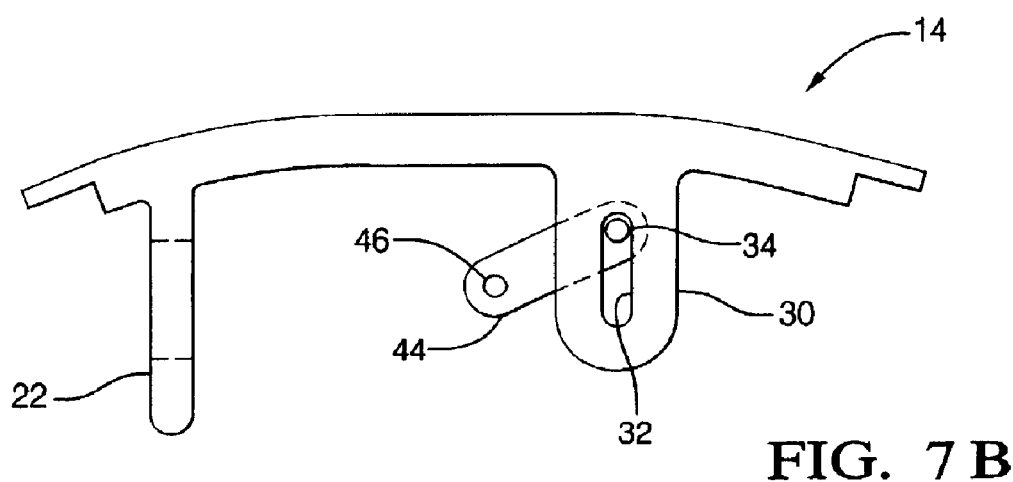
Figure 7C:
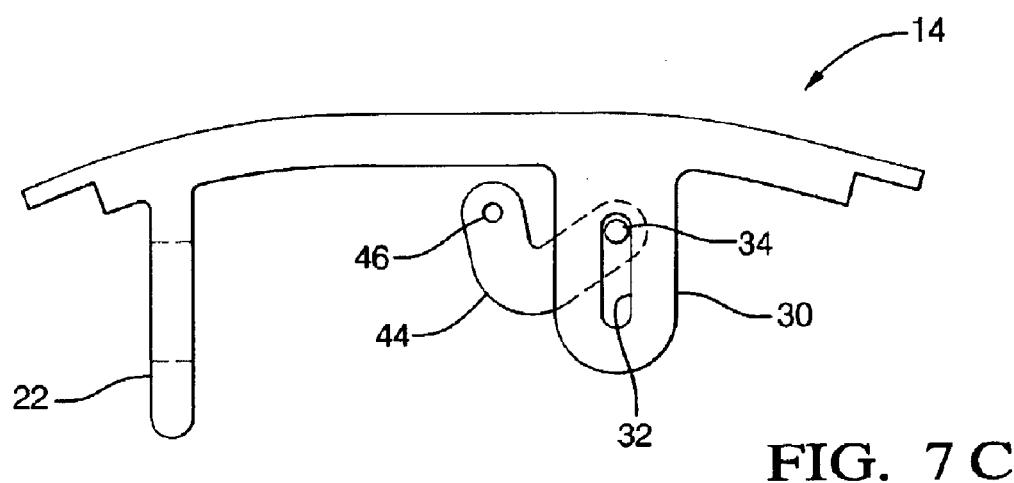
Figure 8:
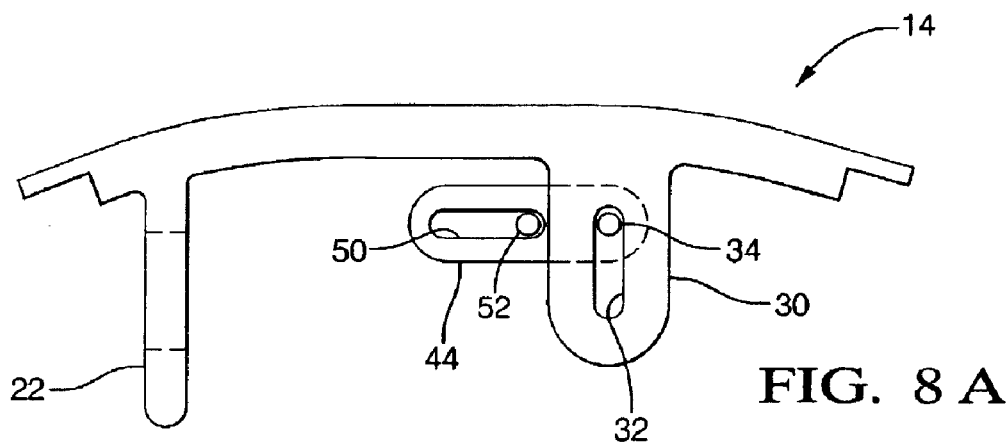
FIGS. 8A–C are yet more alternative embodiments of an airbag module cover arrangement of the present disclosure.
Figure 8:
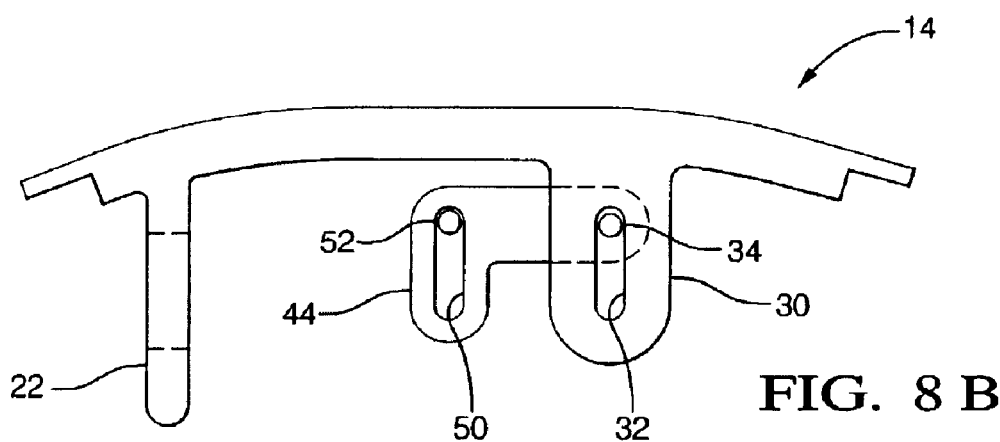
Figure 8:
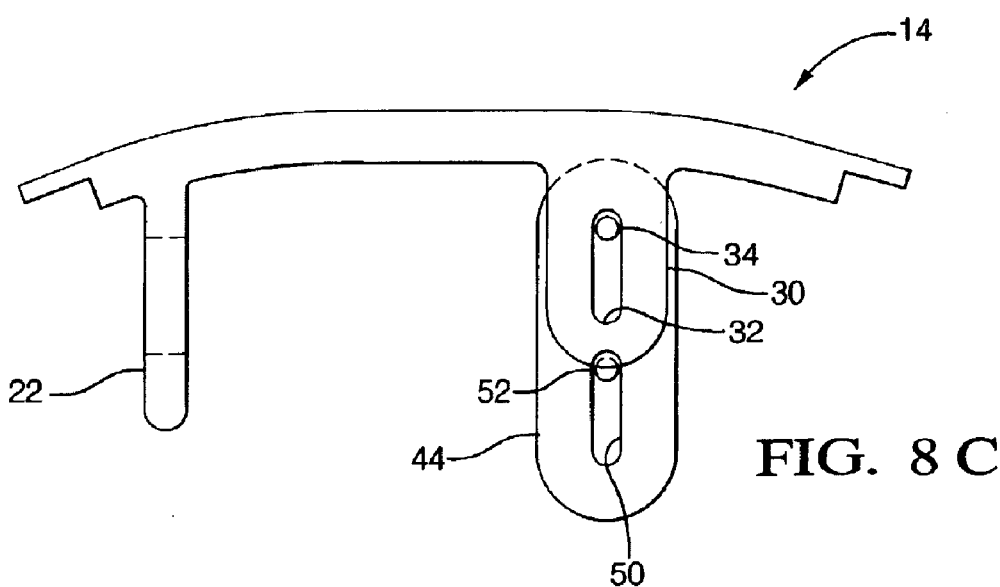
Figure 9:
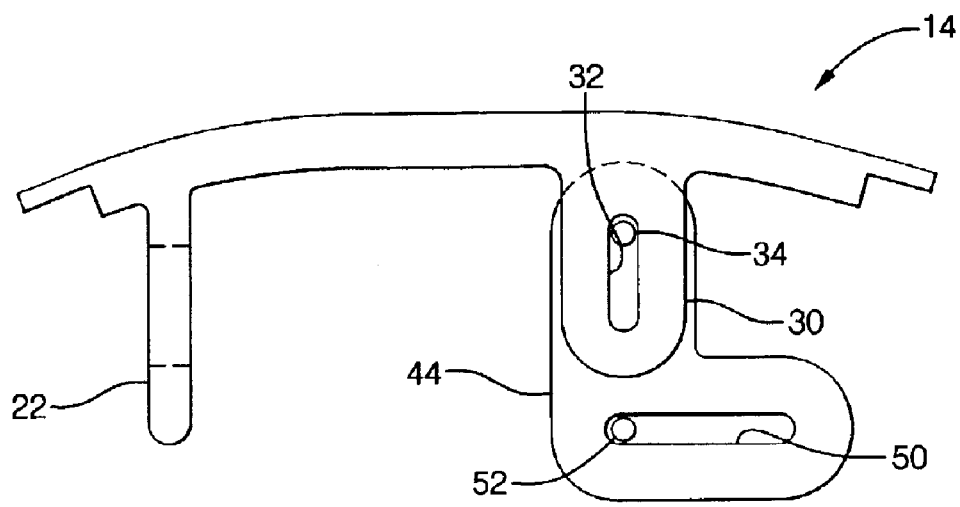
FIGS. 9A–B are still more alternative embodiments of an airbag module cover arrangement of the present disclosure.
Figure 9:
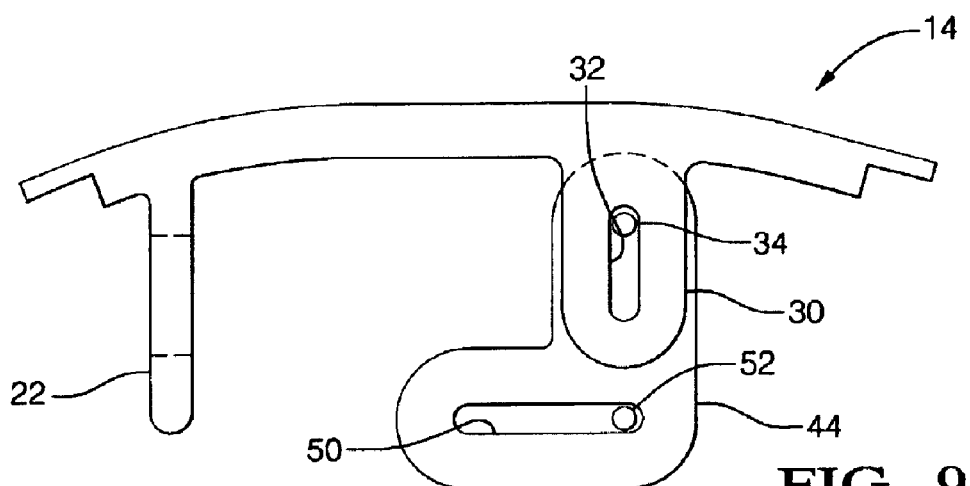

Referring now to FIGS. 7A–7C yet another alternative configuration of side members 30 is illustrated. Here each side member 30 is adapted to interact with a hinging portion or cam member 44. Referring now to FIG. 7A hinging portion 44 is pivotally mounted to the side wall of the housing at one end of by, for example, a mounting pin 46 and is also pivotally mounted to side member 30 and the other end by another mounting pin 48. Accordingly, the configuration in FIG. 7 will allow the deployable door to translate upwardly and then rotate in the direction of arrow 38.

Referring now to FIG. 7B hinging portion 44 is pivotally mounted to the side wall at one end and comprises a guiding member 34 at the other end. As in the previous embodiments guiding member 34 is slidably received with an opening 32 in side member 30. Referring now to FIG. 7C hinging portion 44 is configured to have an "L" shaped configuration wherein the hinging portion is pivotally mounted to the side wall of the housing at one end and comprises a guiding member 34 which is slidably received within an opening 32 of side member 30. Again, the configuration of side member 30 and hinging member 44 allows the deployable door to translate upwardly and then rotate in the direction of arrow 38.

Referring now to FIGS. 8A–8C still another alternative configuration of side members 30 is illustrated. Here each side member 30 is adapted to interact with a hinging portion 44. In these embodiments hinging portion 44 has an opening 50 at one end adapted to slidably receive a guiding member 52 therein. At the other end hinging portion 44 comprises a guiding member 34 which is adapted to be slidably received within an opening 32 of side member 30 in accordance with the discussions of any of the previous embodiments. Each of the embodiments of FIGS. 8A–8C allow for various movements of the deployable door as the inflatable cushion deploys. For example, in FIG. 8A the hinging portion and its opening is disposed horizontally while the side member and its opening has a vertical configuration. FIG. 8B illustrates hinging portion 44 to have an angular configured opening and a curved shaped member. FIG. 8C illustrates hinging member 44 and side member 30 disposed in generally the same location.

Referring now to FIGS. 9A–9B still another alternative configuration of side members 30 is illustrated. Here each side member 30 is adapted to interact with a hinging portion 44 that has an "L" shaped configuration which in the embodiments of FIGS. 9A and 9B are positioned in alternating configurations for movement related to the configuration of hinging member 44.

Figure 10:
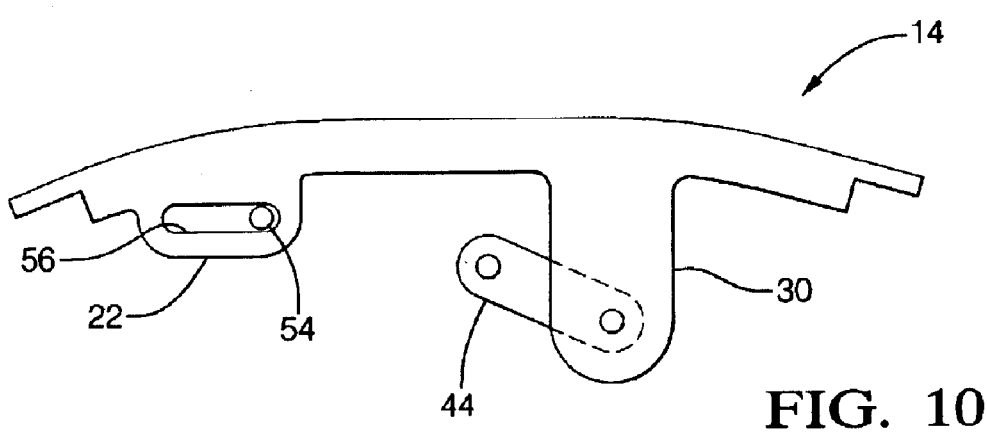
FIG. 10 is another alternative embodiment of an airbag module cover arrangement of the present disclosure.

Referring now to FIG. 10, forward flange 22 is configured to have an opening 54 for receipt of a guiding member 56 therein and side member 30 is adapted to interact with a hinging member 44 which may be any one of the previous embodiments of hinging member 44 in order to provide the desired movement of deployable door 14. It is of course contemplated that the configuration of forward flange 22 illustrated in FIG. 10 may be used in any of the previous embodiments. Also, it is noted that the configuration of forward flange 22 in FIG. 10 may comprise a pair of forward flanges each being disposed at the side walls of the housing for interaction with a pair of guiding members 56.

Accordingly, the deployable door of FIGS. 2–10 provides a dual aspect deployment device having four sub-combinations, which are summarized in a non-limiting fashion below. In a first sub-combination the door opens in a translate/translate manner wherein the door will first translate up out of the instrument panel and then the momentum of the door or the force of the inflating airbag will, cause the door to translate towards the windshield. FIGS. 5B, 6C, 9A and 9B are examples of a deployment door configuration which will provide such a dual aspect opening scenario.

In a second sub-combination the door opens in a translate/rotate manner wherein the door will first translate up out of the instrument panel and then through the momentum of the door or the force of the inflating airbag will rotate forward towards the vehicle windshield. FIGS. 2–4, 5A and 7B–9B are examples of a deployment door configuration which will provide such a dual aspect opening scenario.

In a third sub-combination the door opens in the rotate/translate manner wherein the door will first rotate forward in the vehicle as the cover opens and then the door will translate forward towards the vehicle windshield due to the momentum of the door or the force of the inflating airbag. FIGS. 6B and 10 are examples of a deployment door configuration which will provide such a dual aspect opening scenario.

In the fourth sub-combination the door opens in a rotate/rotate manner wherein the door will first rotate forward in the vehicle as the cover opens and then further rotate forward in the vehicle through the momentum of the door or the force of the inflating airbag. FIGS. 7A and 10 and variations of FIGS. 7C, 8A and 9A are examples of a deployment door configuration which will provide such a dual aspect opening scenario.

Referring to FIGS. 11A and 11B still another embodiment of the present disclosure is illustrated. In this embodiment side member 30 is configured to have a shoulder portion 60 which is adapted to contact a shear pin 62 when deployable door 14 is installed in its preferred location or in the instrument of the vehicle. Shear pin 62 is constructed out of a material or is designed to have a thickness which will cause shear pin 62 to break or disengage from shoulder portion 60 of side member 30 when a source is applied to deployable door 14 generally in the direction indicated by arrow 64. This will allow deployable door 14 to be depressed into opening 18 defined in the instrument panel when a force is applied generally and the direction indicated by arrow 64. The shearing of shear pin 62 is of course contemplated for situations wherein the inflatable cushion of the airbag module does not deploy. In addition, the configuration of opening 32 in side member 30 also allows guiding member 34 to slide therein as the deployable door is depressed within the opening of the instrument panel. Also, and since the opening of forward flange 22 is oversized with respect to the securing member received therein forward flange 22 also allows the deployable door to be depressed within the opening of the instrument panel.

Figure 11:
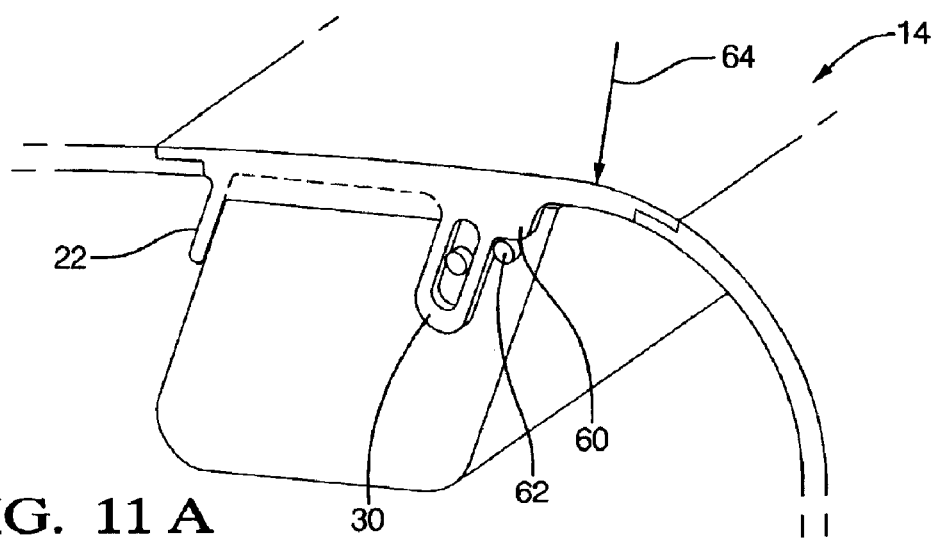
FIGS. 11A–B are another alternative embodiment of an airbag module cover arrangement of the present disclosure.
Figure 11:
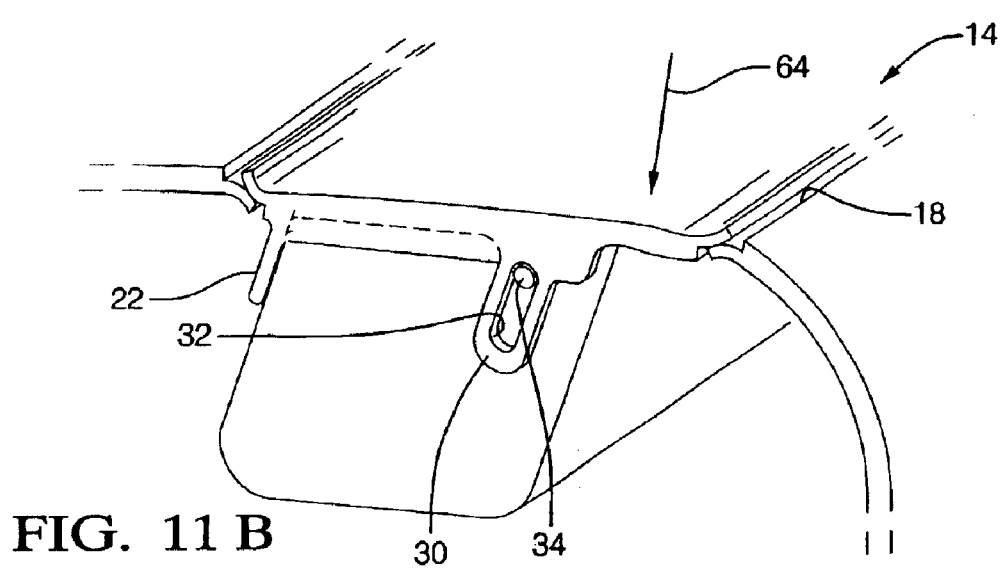
Figure 12:
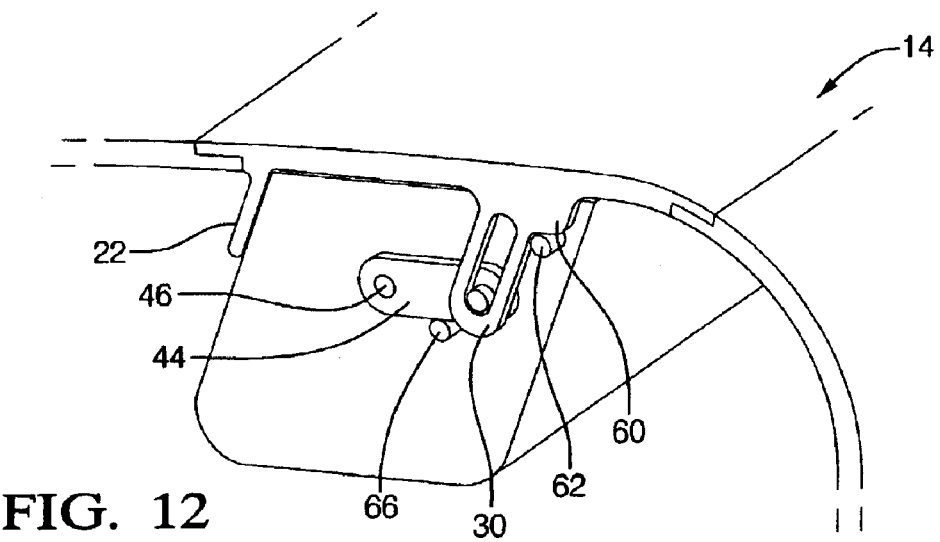
FIG. 12 is another alternative embodiment of an airbag module cover arrangement of the present disclosure.

Referring to FIG. 12 an alternative embodiment of the FIG. 11 embodiment is illustrated. Here to deployable door 14 is configured to have a side member 30 adapted for use with a hinging member such as any one of the hinging members illustrated in FIGS. 7–10. In this embodiment a first shearing pin 62 is disposed to interact with a shoulder portion 60 of side member 30 as discussed directly above and a second shearing pin 66 is positioned to interact with a surface of hinging member 44 which is pivotally mounted to the side wall of the housing via pin 46.

Figure 13:
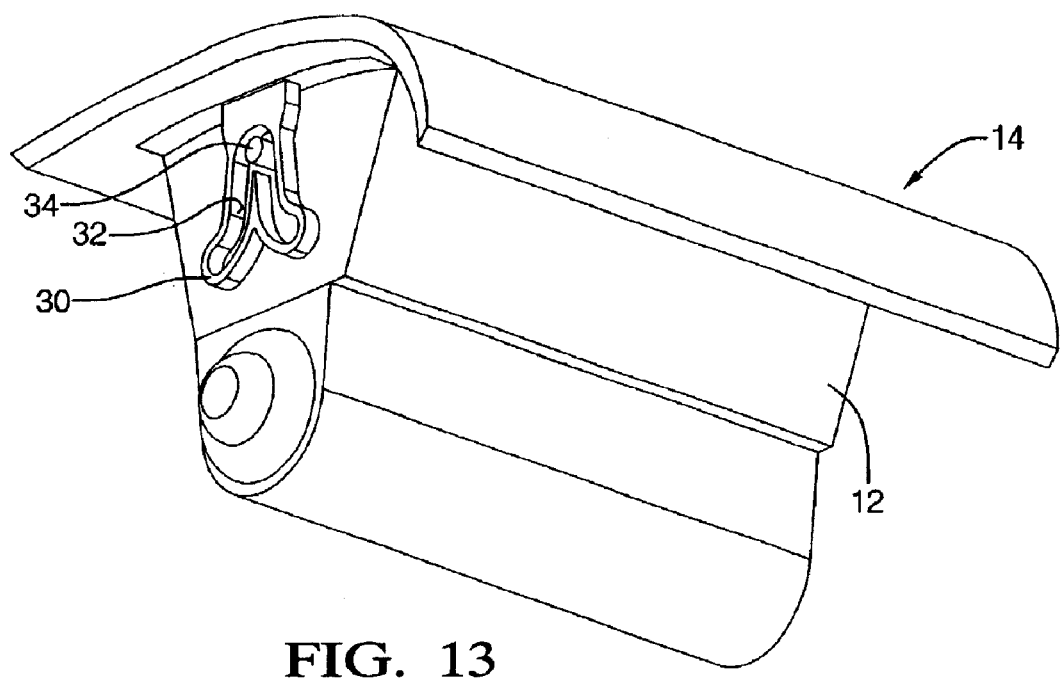
FIGS. 13–15 are yet another alternative embodiment of an airbag module cover arrangement of the present disclosure.
Figure 14:
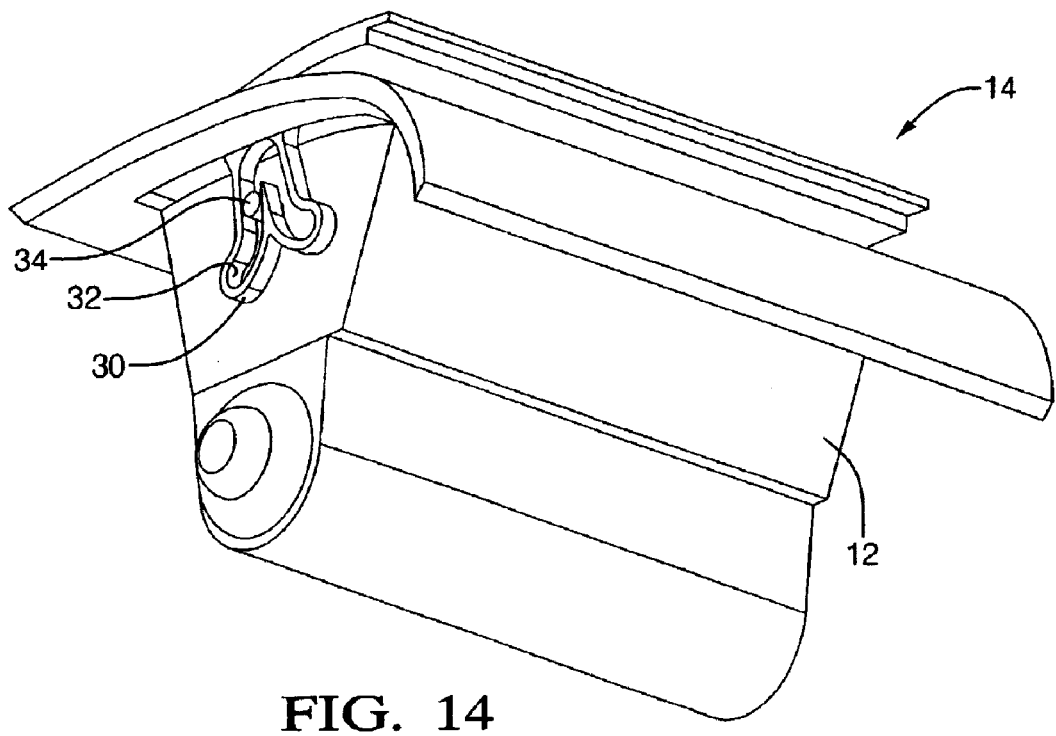
Figure 15:
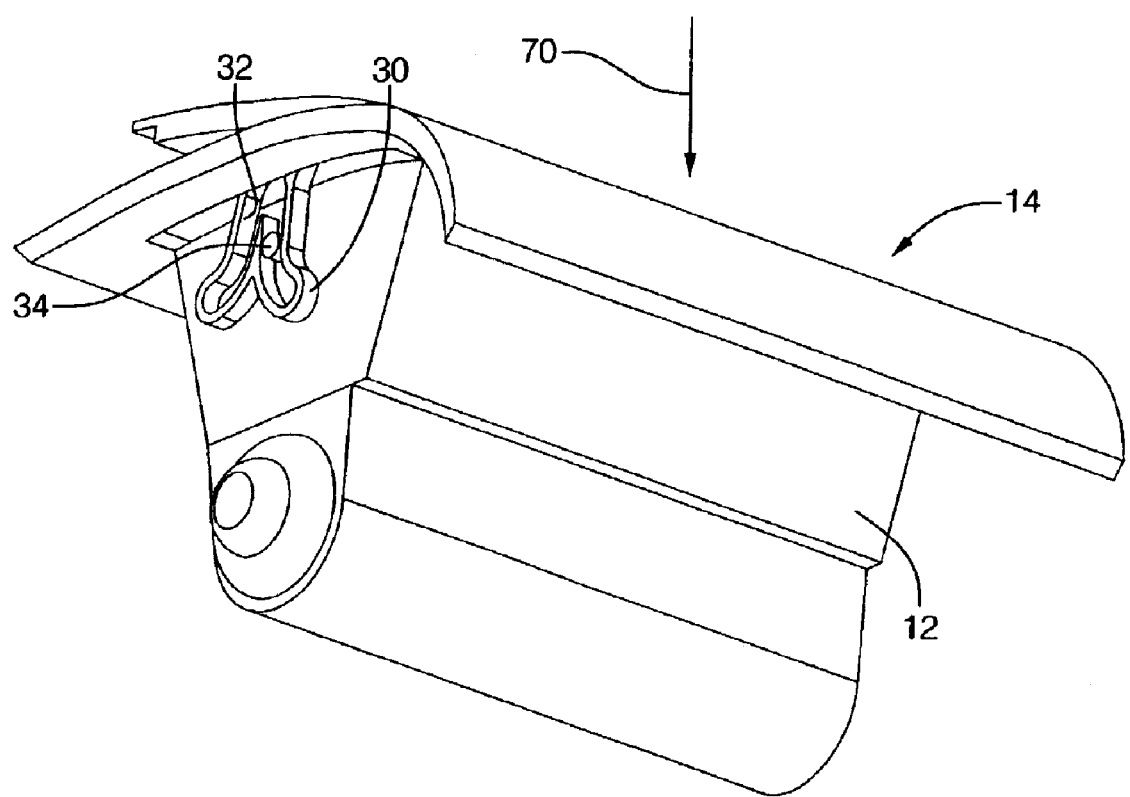

Referring now to FIGS. 13–15 another alternative embodiment of the present disclosure is illustrated. In this embodiment the side member or side flanges of the deployable door are each configured to have an opening which comprises two alternative paths of travel for the guiding member which is secured to the housing. Literally speaking the opening is configured to have an inverted "V" or inverted "Y" shaped configuration wherein the two alternative paths of travel meet with each other at some point. Of course, it is contemplated that the opening of the embodiment of FIGS. 13–15 is not limited to such configurations and any alternative means of performing the same is contemplated to be within the scope of the present disclosure.

Each path of travel is adapted to allow the guiding member to travel in one or the other direction based upon the presence of any load at the rearward edge of the door or for example a load or force generally in the direction of arrow 70 of FIG. 15. As illustrated in the Figures, when the load is present at the rearward edge, the door deploys such that an opening is provided at the rearward edge of the module so that the inflatable cushion can deploy therethrough. However, if the load is present, as illustrated in FIG. 15, the configuration of opening 32 of side member 30 allows guiding member 34 to travel in the direction wherein the door deploys such that the opening is provided at the forward edge of the module instead of the rearward edge of the module. In addition, and as contemplated with the embodiment illustrated in FIGS. 13–15 and with particular reference to the deployment configuration illustrated in FIG. 15 it is noted that the forward member or flange 22 will be configured to detach from the deployable door by for example, positioning a plurality of openings or tear seams in member 22 in order to facilitate such a detachment.

While the invention has been described with reference to one or more exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A door for an airbag module having a housing, an inflatable cushion, the airbag module being adapted to be used in a vehicle having an instrument panel with an airbag module opening, the door having an inner surface and an outer surface adapted to match the instrument panel, comprising:

a first member depending away from the inner surface of the door, said first member being movably secured to the airbag module for relative movement therebetween and remains secured to the module during deployment of the inflatable cushion;

a pair of second members depending away from the inner surface of the door, said pair of second members each having an opening for receiving a guiding member depending away from the housing;

wherein the configuration of the first member and the openings of the pair of second members allows the door of the airbag module to deploy in a first direction until the first member reaches a point of maximum movement in said first direction, wherein the door continues to deploy in a second direction that is defined by further movement of said guiding member in said opening.

2. The door as in claim 1, wherein said first direction is upwardly with respect to the instrument panel and said second direction causes one end of the door to move further away from the instrument panel than another end of the door and the openings of the pair of second members define a first path and a second path, said first path coincides with said first direction and said second path coincides with said second direction.

3. The door as in claim 1, wherein each of the pair of second members are configured to be located about side walls of the housing and the guiding members are configured to depend away from the side walls.

4. The door as in claim 1, wherein the openings of the pair of second members define a first path and a second path, said first path coincides with said first direction and said second path coincides with said second direction.

5. The door as in claim 1, wherein the first member is configured to movably engage a securement assembly that depends from a forward end of the housing.

6. The door as in claim 1, wherein the first member is configured to movably engage a securement assembly within an opening of the first member, said securement assembly depending away from a forward end of the housing.

7. The door as in claim 6, wherein the vehicle has a windshield and wherein the first member and the second members are configured to allow the door to deploy first upwardly with respect to the housing and the instrument panel and then forwardly towards the windshield of the vehicle when said securement assembly engages said opening of said first member.

8. The door as in claim 1, wherein the first member and the pair of second members are each configured to allow the door to move in at least three different directions with respect to the housing when the door is secured to the housing and prior to deployment of the inflatable cushion.

9. A door for an airbag module having a housing, an inflatable cushion, the airbag module being adapted to be used in a vehicle having an instrument panel with an airbag module opening, the door having an inner surface and an outer surface adapted to match the instrument panel, comprising:

a first means for movably securing a forward portion of the door to the housing for relative movement therebetween wherein said forward portion remains secured to the module during deployment of the inflatable cushion;

a second means for movably securing side portions of the door to side walls of the housing;

wherein the configuration of the first means and the second means allows the door of the airbag module to deploy in a first direction until the first means reaches a point of maximum movement in said first direction, wherein the door continues to deploy in a second direction that is defined by said second means.

10. The door as in claim 9, wherein said second means comprises a pair of side members depending away from the door and said pair of side members each having an opening configured to receive and engage a guiding member.

11. The door as in claim 9, wherein said second means comprises a pair of side members depending away from the door and said pair of side members each being received within a gap defined by a pair of guiding members for movement therein, said pair of side members each having an end portion adapted to engage said pair of guiding members and define a limit of travel for said pair of side members.

12. The door as in claim 9, wherein said second means comprises a pair of side members depending away from the door and said pair of side members each being adapted to be movably connected to a pair of hinging members that are pivotally secured to the housing at one end and are pivotally or movably secured to the side members at the other end.

13. The door as in claim 9, wherein said second means comprises a pair of side members depending away from the door and said pair of side members each being adapted to be movably connected to a pair of hinging members that are movably secured to the housing at one end and are pivotally or movably secured to the side members at the other end.

14. The door as in claim 9, wherein said second means further comprises a shoulder portion configured to engage a shear pin of the housing when the door is positioned within the airbag module opening of the instrument panel, wherein said shear pin is adapted to sever upon the application of a force against the door causing the door to be depressed within the airbag module opening of the instrument panel.

15. The door as in claim 14, wherein said second means further comprises a pair of side members depending away from the door and said pair of side members each being adapted to be movably connected to a pair of hinging members that are pivotally secured to the housing at one end and are pivotally or movably secured to the side members at the other end.

16. The door as in claim 15, wherein said pair of hinging members are each configured to engage another shear pin of the housing when the door is positioned within the airbag module opening of the instrument panel, wherein said another shear pin is adapted to sever upon the application of a force against the door causing the door to be depressed within the airbag module opening of the instrument panel.

17. The door as in claim 15, wherein said pair of side members and said first means for securing are adapted to allow the cover to be depressed within the airbag module opening when the shear pins are severed.

18. A door for an airbag module having a housing, an inflatable cushion, the airbag module being adapted to be used in a vehicle having an instrument panel with an airbag module opening, the door having an inner surface and an outer surface adapted to match the instrument panel, comprising:

a pair of securing members depending away from the inner surface of the door, each of said pair of securing members having an opening configured to slidably receive a guiding member depending outwardly from a side wall of the housing, said opening of each of said pair of securing members defining two discrete paths of travel for said guiding member, wherein an application of a force to a rearward edge of the door will cause the guiding member to travel in one of said two discrete paths of travel during deployment of the inflatable cushion and the guiding member will travel in the other one of said two discrete paths in absence of the application of said force to said rearward edge of the door.

19. A door as in claim 18, wherein the inflatable cushion will deploy through an opening defined at the forward edge of the door upon application of said force to said rearward edge of the door and the inflatable cushion will deploy through an opening defined at the rearward edge of the door in absence of said force on said rearward edge of the door.

20. An airbag module having an inflatable cushion for use in a vehicle having an interior surface, comprising:

a housing;

a deployment door having an exterior surface and an inner surface, said exterior surface comprises a portion of the interior surface of the vehicle;

a first member integrally formed with and depending away from said inner surface of said door, said first member being movably secured to the airbag module for relative movement therebetween and remains secured to the module during deployment of the inflatable cushion;

a pair of second members integrally formed with and depending away from said inner surface of said door, said pair of second members each having an opening for receiving a guiding member depending away from said housing;

wherein the configuration of said first member and the openings of said pair of second members allows said door of the airbag module to deploy in a first direction until said first member reaches a point of maximum movement in said first direction, wherein said door continues to deploy in a second direction that is defined by further movement of said guiding member in said opening.

21. The airbag module as in claim 20, wherein each of the pair of second members are configured to be located about side walls of the housing and guiding members are configured to depend away from the sidewalls.

22. The airbag module as in claim 18, wherein the first member is configured to movably engage a securement assembly within an opening of the first member, said securement assembly depending away from a forward end of the housing.

23. The airbag module as in claim 20, wherein the vehicle has a windshield and wherein the first member and the second members are configured to allow the door to deploy first upwardly with respect to the housing and the instrument panel and then forwardly towards the windshield of the vehicle when said securement assembly engages said opening of said first member.

24. An airbag module having an inflatable cushion for use in a vehicle having an interior surface, comprising:

a housing;

a deployment door having an exterior surface and an inner surface, said exterior surface comprises a portion of the interior surface of the vehicle;

a first means for movably securing a forward portion of the door to the housing for relative movement therebetween wherein said forward portion remains secured to the module during deployment of the inflatable cushion;

a second means for movably securing side portions of the door to side walls of the housing;

wherein the configuration of the first means and the second means allows the door of the airbag module to deploy in a first direction until the first means reaches a point of maximum movement in said first direction, wherein the door continues to deploy in a second direction that is defined by said second means.

25. The airbag module as in claim 24, wherein said second means comprises a pair of side members depending away from the door and said pair of side members each being received within a gap defined by a pair of guiding members for movement therein, said pair of side members each having an end portion adapted to engage said pair of guiding members and define a limit of travel for said pair of side members.

26. The airbag module as in claim 24, wherein said second means comprises a pair of side members depending away from the door and said pair of side members each being adapted to be movably connected to a pair of hinging members that are pivotally secured to the housing at one end and are pivotally or movably secured to the side members at the other end.

27. The airbag module as in claim 24, wherein said second means comprises a pair of side members depending away from the door and said pair of side members each being adapted to be movably connected to a pair of hinging members that are movably secured to the housing at one end and are pivotally or movably secured to the side members at the other end.

28. The airbag module as in claim 24, wherein said second means further comprises a shoulder portion configured to engage a shear pin of the housing when the door is positioned within the airbag module opening of the instrument panel, wherein said shear pin is adapted to sever upon the application of a force against the door causing the door to be depressed within the airbag module opening of the instrument panel.

29. The airbag module as in claim 28, wherein said second means further comprises a pair of side members depending away from the door and said pair of side members each being adapted to be movably connected to a pair of hinging members that are pivotally secured to the housing at one end and are pivotally or movably secured to the side members at the other end.

30. The airbag module as in claim 29, wherein said pair of hinging members are each configured to engage another shear pin of the housing when the door is positioned within the airbag module opening of the instrument panel, wherein said another shear pin is adapted to sever upon the application of a force against the door causing the door to be depressed within the airbag module opening of the instrument panel.

31. The airbag module as in claim 29, wherein said pair of side members and said first means for securing are adapted to allow the cover to be depressed within the airbag module opening when the shear pins are severed.

* * * * *